United States Patent
Brady et al.

(10) Patent No.: US 7,731,935 B2
(45) Date of Patent: Jun. 8, 2010

(54) STEAM REFORMING

(75) Inventors: Stuart Ballentyne Brady, County Durham (GB); Peter William Farnell, Cleveland (GB); Martin Fowles, Cleveland (GB)

(73) Assignee: Johnson Matthey PLC, London (GB)

( * ) Notice: Subject to any disclaimer, the term of this patent is extended or adjusted under 35 U.S.C. 154(b) by 286 days.

(21) Appl. No.: 11/911,298

(22) PCT Filed: Mar. 27, 2006

(86) PCT No.: PCT/GB2006/050068
§ 371 (c)(1),
(2), (4) Date: Oct. 11, 2007

(87) PCT Pub. No.: WO2006/109095
PCT Pub. Date: Oct. 19, 2006

(65) Prior Publication Data
US 2009/0123348 A1    May 14, 2009

(30) Foreign Application Priority Data
Apr. 11, 2005   (GB) ................. 0507269.9

(51) Int. Cl.
*C01B 3/26* (2006.01)
*C01B 3/34* (2006.01)
*C01B 3/24* (2006.01)
*C01C 1/04* (2006.01)
*B01J 8/04* (2006.01)
*B01J 8/06* (2006.01)
*B01J 19/00* (2006.01)
*B01J 8/00* (2006.01)
*B01J 7/00* (2006.01)
*F28D 7/00* (2006.01)

(52) U.S. Cl. ............... 423/652; 423/650; 423/651; 423/352; 422/197; 422/196; 422/201; 422/200; 422/198; 422/187; 422/129; 518/700

(58) Field of Classification Search ............. 423/650, 423/651, 652, 653, 53, 352; 422/196, 197, 422/129, 187, 198, 200, 201; 518/700
See application file for complete search history.

(56) References Cited

U.S. PATENT DOCUMENTS
2,700,598 A    1/1955 Odell
(Continued)

FOREIGN PATENT DOCUMENTS
EP    0 194 067 B1    5/1989
(Continued)

OTHER PUBLICATIONS
Esp@cenet patent family list for EP 0194067.*
(Continued)

Primary Examiner—Timothy C Vanoy
Assistant Examiner—Daniel Berns
(74) Attorney, Agent, or Firm—RatnerPrestia (57) ABSTRACT

An apparatus for steam reforming of hydrocarbons comprises a heat exchange reformer having disposed within a plurality of vertical catalyst-filled tubes, through which a gas mixture comprising hydrocarbon and steam may be passed, and to which heat may be transferred by means of a heat exchange medium flowing around the external tube surfaces, wherein heat exchange adapting means are provided within the reformer so that the tubes have a zone of lower heat exchange extending from the bottom of the catalyst up to 25% of the catalyst depth with no heat exchange enhancement means provided in that zone. A process for steam reforming of hydrocarbons employs this apparatus.

15 Claims, 6 Drawing Sheets

U.S. PATENT DOCUMENTS

| | | | |
|---|---|---|---|
| 3,765,851 A | * | 10/1973 | White .......................... 48/209 |
| 4,690,690 A | * | 9/1987 | Andrew et al. ............ 48/214 A |
| 4,810,472 A | * | 3/1989 | Andrew et al. .............. 422/197 |
| 5,023,276 A | * | 6/1991 | Yarrington et al. .......... 518/703 |
| 6,855,272 B2 | * | 2/2005 | Burlingame et al. ........ 252/373 |

FOREIGN PATENT DOCUMENTS

| | | |
|---|---|---|
| EP | 0 194 067 B2 | 5/1994 |
| EP | 0 843 590 B1 | 8/1999 |
| GB | 1 578 270 | 11/1980 |

OTHER PUBLICATIONS

Esp@cenet patent family list for EP 0194067 ('067 doc. published Oct. 9, 1986).*

* cited by examiner

STEAM REFORMING

CROSS-REFERENCE TO RELATED APPLICATIONS

This application is the U.S. National Phase application of PCT International Application No. PCT/GB2006/050068, filed Mar. 27, 2006, and claims priority of British Patent Application No. 0507269.9, filed Apr. 11, 2005.

FIELD OF THE INVENTION

This invention relates to a process of steam reforming hydrocarbons to produce a synthesis gas and to apparatus for carrying out the process.

BACKGROUND OF THE INVENTION

Synthesis gas comprises hydrogen and carbon oxides (carbon monoxide and carbon dioxide) and may contain nitrogen and other inerts such as argon and low levels of methane. The synthesis gas may contain greater or lesser amounts of hydrogen and carbon oxides suited to the particular end use such as hydrogen manufacture for refineries or fuel cells, ammonia synthesis, methanol synthesis, dimethylether synthesis or the Fischer-Tropsch process for the synthesis of liquid hydrocarbons In a steam reforming process a process fluid, i.e. a mixture of a hydrocarbon feedstock and steam, and in some cases also carbon dioxide or other components, is passed at an elevated pressure through catalyst-filled heat exchange tubes, which are externally heated by means of a suitable heating medium, generally a hot gas mixture. The catalyst is normally in the form of shaped units, e.g. cylinders having a plurality of through holes, is typically formed from a refractory support material e.g. alumina, impregnated with a suitable catalytically active metal such as nickel.

The steam reforming reactions are endothermic and heat must be supplied to the gas undergoing reforming. The heat may be provided by combustion gases e.g. combusted methane, in a combustion furnace reformer or by 'externally-heated' hot gases, for example a flue-gas. Alternatively, the catalyst-filled tubes may be externally heated by means of the process gas that has passed through the tubes but which has then been subjected to further processing before being used as the heat exchange medium. The further processing step advantageously includes a step of partial oxidation with an oxygen-containing gas, which both provides further conversion of hydrocarbon feedstock and heats the reformed gas mixture. For example, primary catalytic steam reforming may be effected in a heat exchange reformer in which the catalyst-containing reformer tubes are heated by a secondary reformed gas. Examples of such reformers and processes utilising the same are disclosed in for example GB1578270.

During the commissioning and operation of steam reformers catalyst damage can occur. The damage may be caused by a number of reasons, for example, during catalyst loading, tube vibration, start up and shut down thermal cycling, carbon formation and wetting. The damage so-caused ranges from attrition of the catalyst surfaces, forming dust particles, to catalyst breakage and disintegration. Catalyst damage, if not severe, generally does not cause immediate problems and the reformer continues to operate. However, as the reformer tubes are typically vertical and the flow direction of the gas undergoing reforming is usually downwards, the catalyst fragments and dust generated from the catalyst damage can work their way down to the bottom of the tube.

The catalyst not only acts as the surface for the reforming reaction, but its presence in the tube also acts to enhance heat transfer by increasing turbulence in the flow of process fluid within the tube. We have found that if the catalyst is damaged and a sufficient amount of small fragments of catalyst are present at the bottom of the tube then the heat transfer from the tube wall to the gas undergoing reforming will reduce. As the tubes are being heated from an external source, the tube wall temperature will increase. The pressure drop through the catalyst will also increase and this additional hydraulic load will be transferred to the tube wall thereby increasing the stress. The resulting deformation, also known as creep, will ultimately cause the tube to rupture. Thus, we have found that catalyst breakage and accumulation in the bottom portion of the heat exchange tubes can result in tube failure sooner than expected.

SUMMARY OF THE INVENTION

This invention therefore relates to steam reformer apparatus where the bottom section of the tubes where catalyst debris collects is subject to lower heat transfer and consequently is at a lower temperature so that failure due to creep is reduced.

Accordingly the invention provides apparatus for steam reforming of hydrocarbons comprising a heat exchange reformer having disposed within a plurality of vertical catalyst-filled tubes, through which a gas mixture comprising hydrocarbon and steam may be passed, and to which heat may be transferred by means of a heat exchange medium flowing around the external tube surfaces, wherein heat exchange adapting means are provided within the reformer so that the tubes have a zone of lower heat exchange extending from the bottom of the catalyst-filled tubes up to 25% of the catalyst depth with no heat exchange enhancement means provided in said zone.

The invention further provides a process for steam reforming of hydrocarbons to generate a reformed gas mixture, including the steps of (i) passing a gas mixture, comprising hydrocarbon and steam through a plurality of catalyst-filled tubes disposed vertically within a heat exchange reformer, and (ii) transferring heat to the mixture undergoing reforming by means of a heat exchange medium flowing around the external surfaces of said tubes wherein the reformer comprises heat exchange adapting means within the reformer so that the heat transferred between the heat exchange medium and said mixture passing through said tubes is lower in a zone extending from the bottom of the catalyst-filled tubes up to 25% of the catalyst depth than the heat transferred between the heat exchange medium and said mixture above said zone, with no heat exchange enhancement means provided in said zone so that the temperature of the external surfaces of the tubes in said zone is lower.

BRIEF DESCRIPTION OF THE DRAWINGS

A number of embodiments of the present invention are described below with reference to FIGS. 1-6.

DETAILED DESCRIPTION OF THE INVENTION

By "heat exchange reformer" we mean a reformer in which the majority (>50%, preferably >75%) of the heat exchange between the heating medium and the catalyst filled tubes occurs by convection rather than radiation, for example in gas heated reformers or flue-gas heated reformers. In such reformers the heat exchange medium may be heated by heating means comprising partial oxidation or combustion means, which may be external or internal to the reformer itself.

By "zone of lower heat exchange" we mean that the amount of heat exchanged between the heat exchange medium and the catalyst filled tubes though which the gas undergoing reforming is less in a zone extending from the bottom of the catalyst filled tubes up to 25% of the catalyst depth. Preferably the amount of heat transferred is 80% or less in the zone of lower heat exchange than above it. The effect of lower heat transfer is a lower tube wall temperature. This invention therefore runs contrary to normal heat exchange design where generally the heat transfer from the heat exchange medium to/from the process fluid is maximised. In particular, in the present invention no heat exchange enhancement means are provided in the zone of lower heat exchange so that the surface temperature of the tubes in said zone is lower.

The present invention is particularly applicable to heat exchange reformers heated by the reformed gas from the heat exchange reformer that has been subjected to a further processing step including a step of partial combustion, such as secondary reforming. Thus preferably the reformer is a gas-heated reformer and the heat exchange medium is a secondary reformed gas.

In a reformer, a process fluid, i.e. the hydrocarbon/steam mixture, is passed from a process fluid feed zone, through heat exchange tubes containing a particulate catalyst, disposed within a heat exchange zone defined by a casing through which a heat exchange medium passes, and then into a process fluid off-take zone. Means, such as tube-sheets, are provided to separate the zones. Thus a tube-sheet may separate the heat exchange zone through which the heat exchange medium passes from a zone, such as a plenum chamber, communicating with the interior of the heat exchange tubes to permit feed of process fluid to the tubes or off-take of process fluid from the tubes. An alternative arrangement involves the use of header pipes disposed within the heat exchange zone to define the process fluid feed zone: the process fluid is fed to the header pipes from whence it flows into and through the heat exchange tubes. Similarly header pipes may be provided for the off-take of process fluid from the tubes. Alternatively there may be a combination of tube-sheets and header pipes, for example the process fluid may be fed to the heat exchange tubes from a plenum chamber separated from the heat exchange zone by a tube-sheet while header pipes are provided disposed within the heat exchange zone for off-take of process fluid from the tubes. Such tube-sheets or headers may be termed boundary means as they define boundaries between the heat exchange zone and the process fluid feed and off-take zones.

Preferably heat exchange medium distribution means are provided within the reformer that cause the heat exchange medium to flow evenly upwards from the bottom of the reformer through the zone of lower heat exchange in a direction axially aligned with the catalyst filled tubes.

The heat exchange tubes may have a circular, oval or polygonal cross section, typically have a length of 5 to 15 m and preferably a diameter in the range 7 to 20 cm. The wall thickness of the tubes may be 1->10 mm, but is preferably 2-10 mm. The heat-exchange tubes preferably have a circular cross-section. The circular cross-section of the heat-exchange tubes better allows them to withstand the pressure differential between the pressure of the process fluid within the tubes and the pressure of the heating medium. The tubes are typically fabricated from suitable steels are preferably coated on their external surfaces with a 40-60% (Ni) nickel-chrome alloy, preferably having an iron content below 3% wt. Such coatings advantageously reduce the susceptibility of the tubes to metal dusting corrosion caused by the heat exchange medium.

In operation, the heat-exchange tubes are heated to a high temperature, typically to a temperature in the range 650° C. to $\geq$900° C. This heating necessarily means that the tubes are subject to thermal expansion, both longitudinally and radially, as the tubes are heated from ambient temperature to the operating temperature and likewise to thermal contraction as the tube is cooled upon shut down of the process. Because the heat-exchange tubes are of considerable length, the tubes can expand longitudinally by an amount, often 10 cm or more, relative to the casing to which the boundary means is fastened. Thus preferably the heat-exchange tubes are moveably attached to at least one of the boundary means. By the term "moveably attached" we mean that the tube is attached to the boundary means by means that allow for the thermal expansion and contraction of the heat-exchange tubes. Normal practice is to provide flexible elements known as "pigtails" at one or both ends of the tubes to permit such differential expansion so that the pigtails, rather than the tubes themselves are fastened to boundary means. Alternatively, bellows arrangements may be employed to permit such expansion. Preferably, venturi-seal designs as described in EP-B-0843590 may be employed. In the present invention, the heat-exchange tubes are preferably moveably attached to one boundary means and non-moveably attached to the other. Thus the heat-exchange tubes preferably extend from a first boundary means to which they are non-moveably attached, through the heat exchange zone, and are moveably attached by means of e.g. pigtails, bellows or venturi seal tubes, to a second boundary means.

Preferably, the heat exchange medium is either the reformed gas mixture that has been subjected to a further process step comprising a step of partial oxidation with an oxygen containing gas or a fluegas generated by the combustion of a suitable fuel.

The hydrocarbon feedstock may be methane, natural gas or naphtha, and is preferably a natural gas containing a high (i.e. >90%) methane content. Prior to reforming the hydrocarbon feedstock is preferably desulphurised e.g. by passing the hydrocarbon though a bed of a suitable sulphur compound absorbent such as zinc oxide.

The steam reforming catalyst is normally in the form of shaped units, e.g. cylinders, rings, saddles, and cylinders having a plurality of through holes, and are typically formed from a refractory support material e.g. alumina, calcium aluminate cement, magnesia or zirconia impregnated with a suitable catalytically active metal such as nickel. We have found that improved catalyst performance at low steam ratios may be achieved where at least a portion of the catalyst includes a precious metal such as ruthenium. Also, preferably the catalyst is in the form of lobed or fluted cylinders having a passage, or preferably more than one passage, extending longitudinally there through as this has been found to offer high catalyst activity combined with low pressure drop through the tubes. The shaped units are prevented from falling out of the tubes by a mesh or grill suitably fixed at the bottom of the tube above the pigtail, bellows or venturi seal.

During the reforming process, methane reacts with steam to produce hydrogen and carbon oxides. Any hydrocarbons containing two or more carbon atoms that are present are converted to methane, carbon monoxide and hydrogen, and in addition, the reversible water-gas shift reactions occur.

Preferably the reformer is a heat exchange reformer in which the heat exchange medium is a flue gas or other suitable hot gas. In a preferred embodiment the heat exchange medium is the partially reformed gas leaving the tubes of the heat exchange reformer that has been subjected to a further process step. Accordingly, a preferred process for steam reforming comprises the steps of (i) passing a gas mixture, comprising hydrocarbon and steam through a plurality of vertical catalyst-filled tubes to which heat is transferred by means of a heat exchange medium flowing around the external surfaces of said tubes within a heat exchange reformer, to generate a partially reformed gas mixture, (ii) subjecting the partially reformed gas mixture to a further process step including a step of partial oxidation in which the temperature of the resulting gas mixture is increased, and (iii) passing said resulting gas mixture to the heat exchange reformer as the heat exchange medium wherein the reformer comprises heat exchange adapting means so the heat transferred between the heat exchange medium and said mixture passing through said tubes is lower in a zone extending from the bottom of the catalyst up to 25% of the catalyst depth than the heat transferred between the heat exchange medium and said mixture above said zone, with no heat exchange enhancement means provided in said zone so that the temperature of the external surfaces of the tubes in said zone is lower.

Preferably the further process step (ii) comprises a step of partial oxidation of the partially reformed gas mixture with an oxygen containing gas such as oxygen, air or oxygen-enriched air. More preferably the further step comprises a step of secondary reforming in a secondary reformer in which the partially reformed gas mixture is subjected to a step of partial oxidation with an oxygen containing gas such as oxygen, air or oxygen-enriched air, optionally with steam, and the resulting partially combusted gas mixture, which is heated by the exothermic oxidation reactions, is passed through a bed of steam reforming catalyst that brings the gas composition towards equilibrium.

Steam reforming reactions take place in the tubes over the steam reforming catalyst at temperatures above 350° C. and typically the process fluid exiting the tubes is at a temperature in the range 650-950° C. The heat exchange medium flowing around the outside of the tubes may have a temperature in the range 900-1300° C.

In the present invention, the temperature of the surfaces of the tubes in the zone of lower heat transfer is lower than that above said zone. The temperature of the tubes in the zone of lower heat transfer is preferably ≧20° C. lower, more preferably ≧40° C. lower than the case where no zone of lower heat transfer is present. Hence temperature of the external surfaces of the tubes in the zone of lower heat exchange is preferably ≧20° C. cooler that the external surface of the tubes above said zone.

In the present invention, heat exchange reformers are preferred in which the differential pressure between the heating medium and the process fluid is preferably 0.5 to 10 bar.

In the present invention, the tubes have a zone of lower heat exchange extending from the bottom of the catalyst-filled tubes up to 25% of the catalyst depth. Because lowering the heat transfer from the heat exchange medium may reduce the efficiency of the reforming process, the lower heat exchange zone is preferably ≦20%, more preferably ≦15% of the catalyst depth. However, preferably the zone of lower heat exchange comprises at least 5% of the catalyst depth. In a typical heat exchange reformer the zone of lower heat transfer is desirably about 0.5-2.0 meters from the bottom of the catalyst in the tube. Tests have found that catalyst debris builds up in the bottom of the tubes to these depths.

The zone of lower heat exchange is provided by heat exchange adapting means within the reformer heat exchange zone that increase or reduce the heat transferred between the heating medium and the heat exchange tubes. A number of embodiments are described herein by which the zone of lower heat transfer may be achieved. We have found that by ensuring the portion of the tubes corresponding to the zone of lower heat transfer is devoid of heat exchange enhancing means such as sheath tubes, fins or baffles, the lower portion of the tubes will have a suitably lower temperature. In a tube bundle such as used in a heat exchanger or tubular reactor, the spacing of the tubes as measured by the tube pitch (centre line to centre line measurement between adjacent tubes) is typically no less than 1.25 times the outside tube diameter due to mechanical design and fabrication limitation on the tube sheets to which the tubes are attached. Thus, the mechanical design of the tube bundle sets a characteristic free flow area around the outside of the catalyst tubes through which the heat exchange medium must flow. Typically, this will be at low velocity and with a commensurately low heat transfer coefficient. Typically, this heat transfer coefficient is too low to achieve an economically sized heat exchange reformer. Thus in heat exchange reformers heat transfer enhancement means are usually provided over the whole length of the tubes to increase the heat transfer over and above this low heat transfer level. It is an object of the present invention however to maintain a zone of lower heat transfer by having no enhancement in this zone.

Furthermore, the lower heat transfer zone may also be achieved by providing heat exchange reducing means that mask, protect or insulate the portion of the tube in the zone of lower heat transfer. Heat exchange reducing means include insulating means such as ceramic fibre blankets or refractory layers known to those skilled in the art. It is also possible to blank off portions of the tubes with tube plates or open-ended shrouds that prevent access of heating medium to the tube surfaces and allow for thermal expansion and contraction.

In particular it is possible to combine both heat exchange reducing means in the zone of lower heat exchange with heat exchange enhancing means above this zone to maximise reforming efficiency whilst protecting the tubes from increased wall temperatures.

It will be understood by the skilled man that where the term "heat exchange" has been used, the term "heat transfer" may equally be used and vice versa.

The apparatus and process of the present invention may be used as part of a process for the manufacture of hydrogen, methanol, dimethylether, ammonia, urea or hydrocarbon liquids, e.g. diesel fuels, obtained by the Fischer-Tropsch synthesis. Thus the reformed gas mixture obtained using the apparatus or in the process of the present invention may be subjected to further process steps including a step of methanol synthesis or a step of ammonia synthesis or a step of Fischer-Tropsch hydrocarbon liquid synthesis. Preferably the process is part of a process for the manufacture of methanol, ammonia or hydrocarbon liquids.

Figure 1:
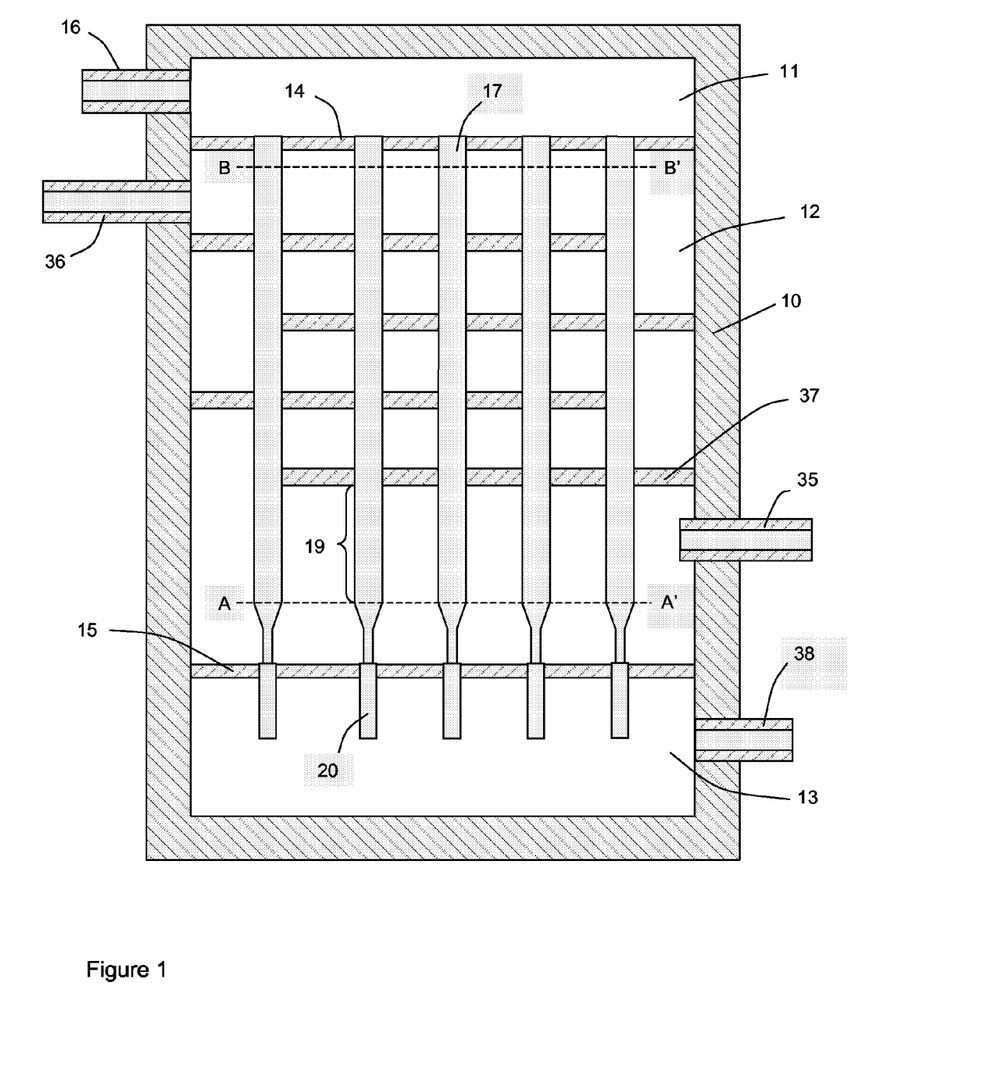
FIGS. 1-3 depict different embodiments of a baffled heat exchange reformer in which heat exchange is enhanced above the zone of lower heat exchange by means of baffles and where either baffles are absent from the zone of lower heat exchange (FIG. 1) a perforated plate is present to define the zone of low heat exchange (FIG. 2) or where the tubes are shielded in the zone of lower heat exchange by heat exchange reducing means consisting of blanking plates (FIG. 3).

In FIG. 1 there is shown a heat exchange reformer, having an outer insulated pressure shell 10 enclosing three zones 11, 12, 13, defined by the shell walls and tube sheets 14 and 15. Zone 11, a process fluid feed zone, is defined by the shell walls and tube sheet 14. It is provided with a process fluid supply conduit 16 and has a plurality of heat exchange tubes, 17 fastened to, and extending downwards from, tube sheet 14. The number of tubes employed will depend on the scale of operation: although only five tubes are shown there may be typically be 50 or more such tubes. For steam reforming, the tubes 17 will be filled from a position near the bottom of the tubes to the top of the tubes (A-A' to B-B') with shaped units of a suitable steam reforming catalyst, for example nickel on alumina. Zone 12, a heat exchange zone, is defined by the shell walls and tube sheets 14 and 15. Heat exchange tubes 17 extend through zone 12 and are moveably attached by venturi seals 20 to tube sheet 15. Heat exchange zone 12 is fed with heating medium, e.g. hot gases, via conduit 35 positioned in shell 10 near the bottom of tubes 17. The heating medium passes upward in heat exchange zone where it exchanges heat with the tubes 17 and is then removed via conduit 36 positioned in shell 10 near the top of tubes 17. A plurality of transverse baffles 37 are positioned distant from the bottom of the catalyst (A-A'). The first transverse baffle is disposed horizontally at a level corresponding to between 5- and 25% of the catalyst depth (A-A' to B-B') and therefore defines the zone 19 of lower heat exchange. The transverse baffles 37 act to divert the heating medium horizontally across the reformer and enhance its heat exchange with the tubes. Because the first baffle 37 is positioned distant from the bottom of the catalyst, the surface temperature of tubes in the zone 19 will be cooler. Zone 13, the process fluid off-take zone, is defined by the walls of shell 10 and the tube sheet 15. The venturi seals 20 are open-ended and extend below tube sheet 15 into off-take zone 13. The reformed gases pass from tubes 17 through venturi seals 20 and into zone 13 from which they are removed by process fluid off-take conduit 38. In use, a process fluid comprising hydrocarbon and steam is fed at elevated temperature and pressure through conduit 16 to zone 11 and thence downward through catalyst-filled tubes 17. Heat is exchanged with heating medium in heat exchange zone 12 and reforming reactions take place. The gases undergoing reforming pass through the tubes 17 to zone 19 of lower heat exchange and thence though venturi seals 20 to zone 13 from which it is removed by conduit 38.

Figure 2:
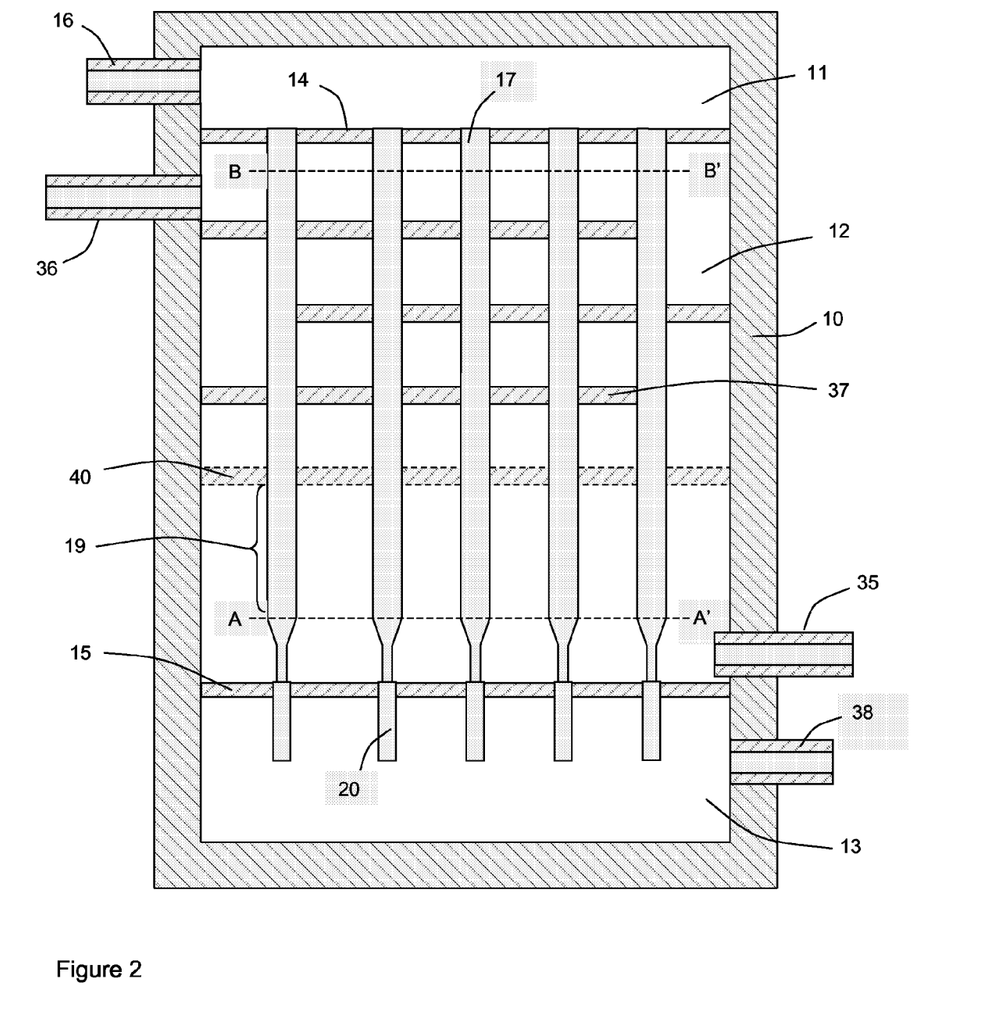

In FIG. 2 a heat exchange reformer of FIG. 1 is depicted except that the first baffle 37 is replaced by a perforated plate 40 that extends across the heat exchange zone parallel to the tube sheet 15, distant from the bottom of the catalyst at a level corresponding to between 5 and 25% of the catalyst depth (A-A' to B-B'). The perforated plate 40 therefore defines the zone 19 of lower heat exchange. The heat exchange medium is restricted to substantially vertical, i.e. axial flow in the zone 19 of lower heat exchange. Above perforated plate 40, the heat exchange medium flows horizontally as a result of the transverse baffles 37 and the heat transfer is thereby enhanced above the perforated plate 40.

Figure 3:
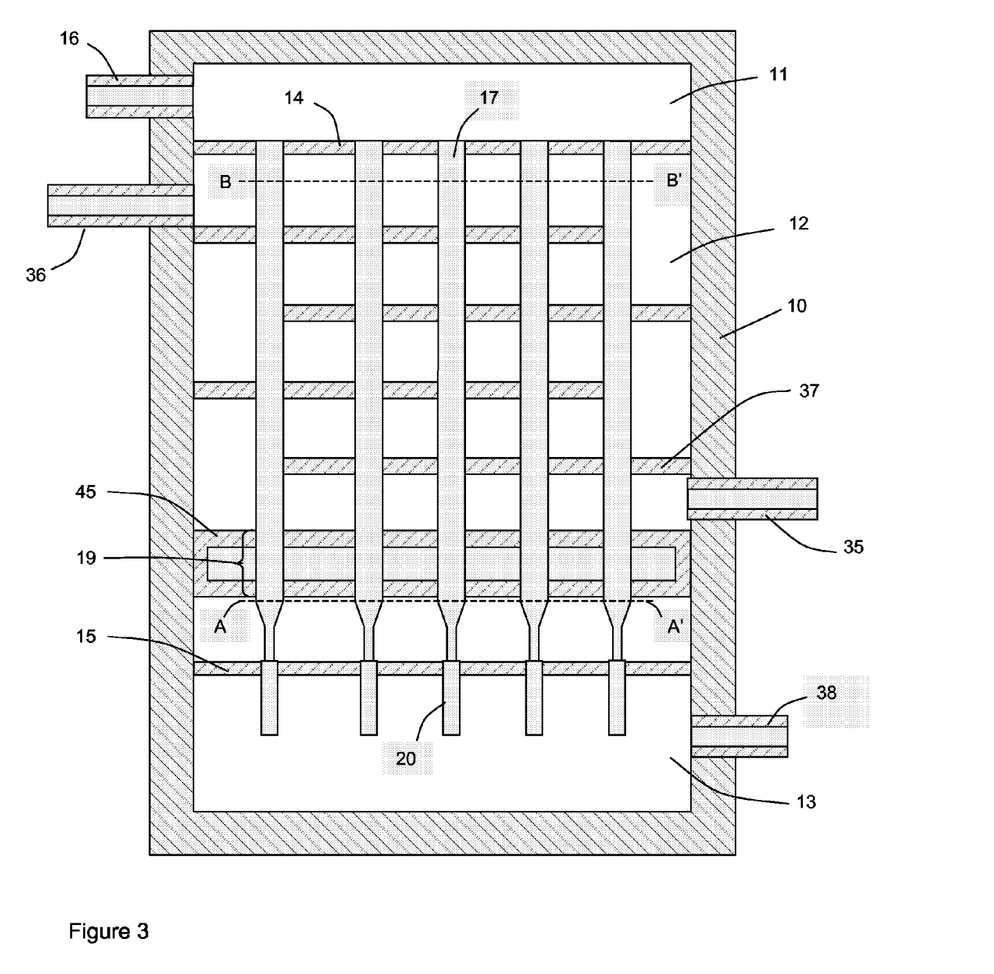

In FIG. 3, a heat exchange reformer of FIG. 1 is depicted except that the lower portion of the tubes 17 are shielded from the heat exchange medium by means of a shroud 45 in the form of a metal cylinder, co-axial with the reformer, extending across the heat exchange zone 12 from the bottom of the catalyst-filled tubes for a height between 5 and 25% of the catalyst depth and defining the zone 19 of lower heat exchange. The tubes 17 extend through the cylinder and are moveably connected to tube sheet 15.

Figure 4:
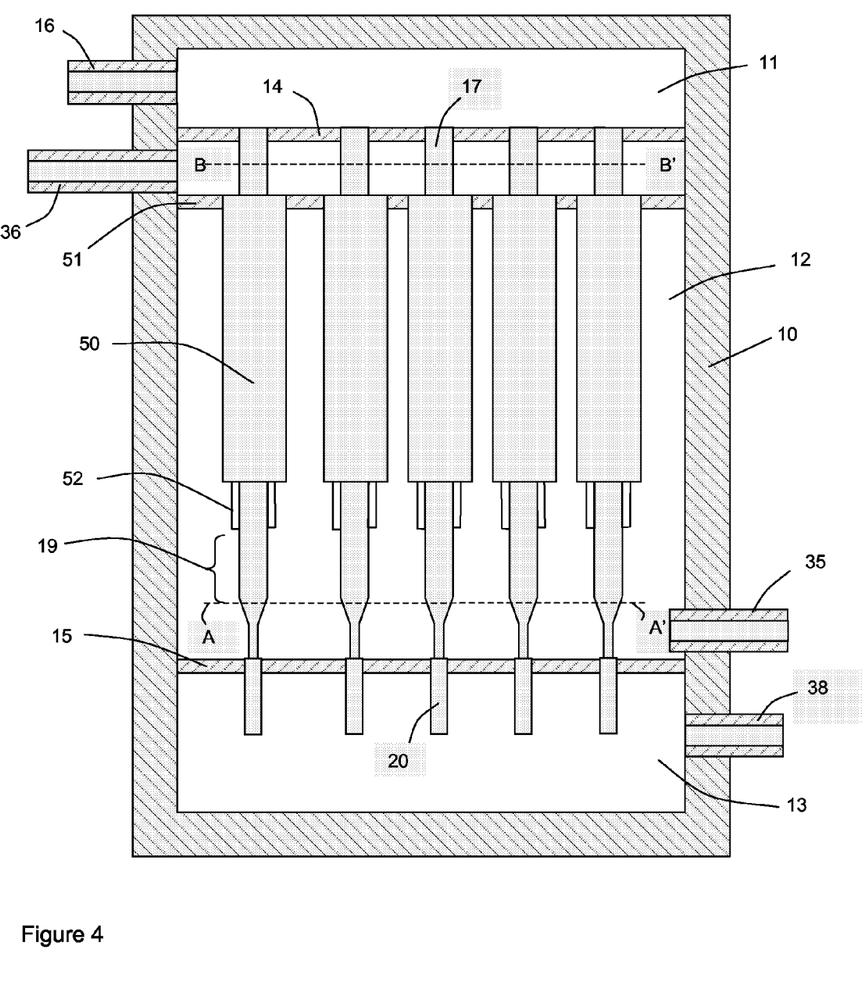
FIGS. 4 and 5 depict different embodiments of a heat exchange reformer in which heat exchange between the heat exchange medium and the heat exchange tubes is enhanced above the zone of lower heat exchange by means of sheath tubes and where either sheath tubes are absent from the zone of lower heat exchange (FIG. 4) or the heat exchange tubes in the zone of lower heat exchange are shielded from the heat exchange medium by a layer of ceramic or refractory insulation is provided around each tube (FIG. 5).

In FIG. 4 there is shown a heat exchange reformer, having an outer insulated pressure shell 10 enclosing three zones 11, 12, 13, defined by the shell walls and tube sheets 14 and 15. Zone 11, a process fluid feed zone, is defined by the shell walls and tube sheet 14. It is provided with a process fluid supply conduit 16 and has a plurality of heat exchange tubes, 17 fastened to, and extending downwards from, tube sheet 14. The number of tubes employed will depend on the scale of operation: although only five tubes are shown there may be typically be 50 or more such tubes. For steam reforming, the tubes 17 will be filled from a position near the bottom of the tubes to the top of the tubes (A-A' to B-B') with shaped units of a suitable steam reforming catalyst, for example nickel on alumina. Zone 12, a heat exchange zone, is defined by the shell walls and tube sheets 14 and 15. Heat exchange tubes 17 extend through zone 12 and are moveably attached by venturi seals 20 to tube sheet 15. Heat exchange zone 12 is fed with heating medium, e.g. hot gases, via conduit 35 positioned in shell 10 near the bottom of tubes 17. The heating medium passes upward in heat exchange zone where it exchanges heat with the tubes 17 and is then removed via conduit 36 positioned in shell 10 near the top of tubes 17. Around each tube 17 is provided a sheath tube 50 to enhance the heat exchange of the heat exchange medium with tubes 17. The sheath tubes 50 have a generally circular cross-section with an inner diameter providing an annulus between the sheath tube and the heat-exchange tube 17 of between 1 and 10 mm. Hence the sheath tubes 50 provide even, annular passages through which the heat-exchange medium flows that enhance the heat transfer between the heat-exchange tube 17 and heat-exchange medium by forcing at least some of the medium to flow in a controlled higher velocity manner over the external surface of the heat-exchange tubes.

The sheath tubes 50 are supported by a sheath tube sheet 51 extending across the heat exchange zone 12 below the conduit 36. The sheath tubes extend down the heat exchange tubes 17 from tube sheet 51 for a portion of their length to a position above the zone 19 of lower heat exchange. Fins 52 are attached to the heat exchange tubes 17 to further enhance heat transfer. The fins may extend along the length of the tube 17 corresponding to the length of the sheath tube 50 or may extend further as depicted. The zone 19 of lower heat exchange is defined by the limit of these heat exchange enhancing means and extends from the bottom of the catalyst-filled tubes to between 5 and 25% of the catalyst depth (A-A' to B-B'). Below these heat exchange enhancing means (50, 52), the temperature of tubes will be cooler. Zone 13, the process fluid off-take zone, is defined by the walls of shell 10 and the tube sheet 15. The venturi seals 20 are open-ended and extend below tube sheet 15 into off-take zone 13. The reformed gases pass from tubes 17 through venturi seals 20 and into zone 13 from which they are removed by process fluid off-take conduit 38. In use, a process fluid comprising hydrocarbon and steam is fed at elevated temperature and pressure through conduit 16 to zone 11 and thence downward through catalyst-filled tubes 17. Heat is exchanged with heating medium in heat exchange zone 12 and reforming reactions take place. The gases undergoing reforming pass through the tubes 17 to zone 19 of lower heat exchange and thence though venturi seals 20 to zone 13 from which it is removed by conduit 38. Additional heat exchange medium distribution means (not shown) may be installed at the bottom of zone 12 to ensure that the flow of heating medium is restricted to substantially vertical flow in the zone of lower heat exchange 19.

Figure 5:
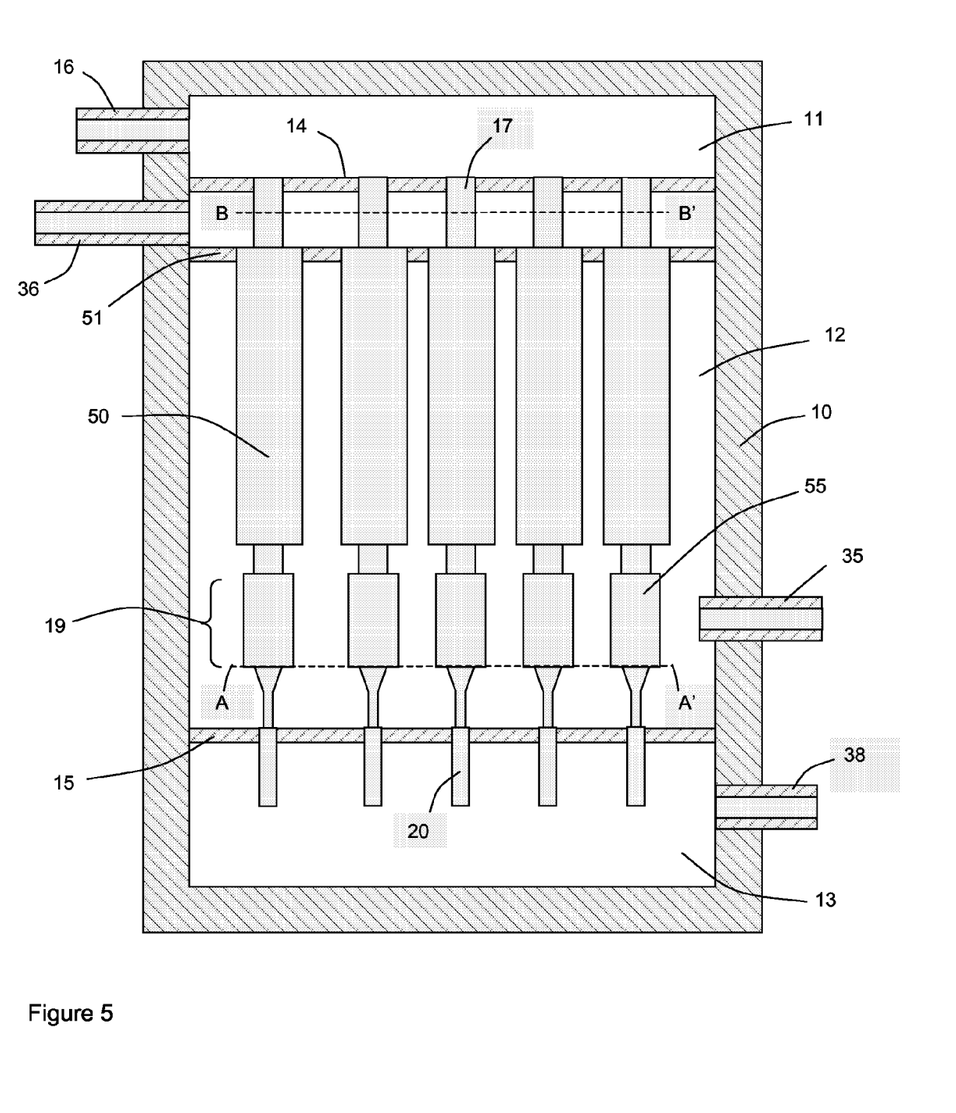

In FIG. 5, a heat exchange reformer of FIG. 4 is depicted except that the fins are omitted and a coating of refractory or ceramic insulation 55 is provided around the base of each tube that extends up from tube sheet 15 along the tubes for a distance up to 25% of the depth of the catalyst-filled tubes thereby preventing contact of the heat exchange medium with the external surface of the tubes and defining the zone 19 of lower heat exchange. To hold the ceramic or refractory insulation 55 in place it may be surrounded by a metal band or sleeve.

The person skilled in the art will recognise that the embodiments shown in FIGS. 1-5 may be combined to create a series of additional embodiments and the present invention is not restricted to the embodiments illustrated in FIGS. 1-5.

Figure 6:
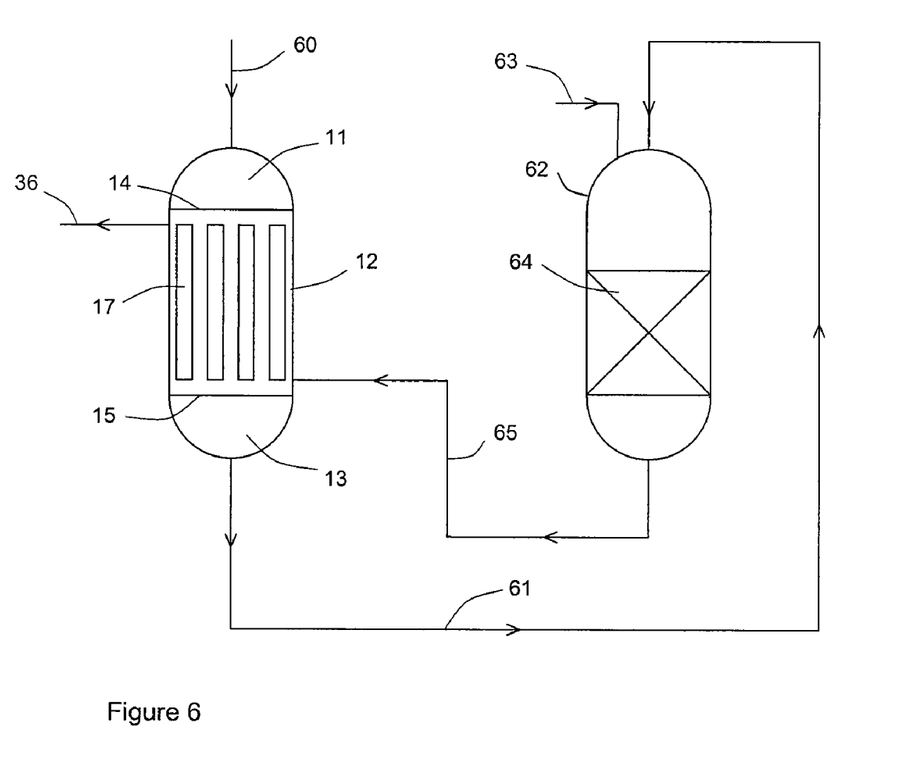
FIG. 6 depicts a process flow sheet according to a preferred embodiment in which the partially reformed gas mixture is subjected to a stage of secondary reforming and used as the heat exchange medium. In each of FIGS. 1-5, catalyst is loaded in the tubes between lines A-A' and B'-B'.

FIG. 6 depicts a process for the steam reforming of a hydrocarbon feedstock. Process fluid comprising a mixture of a hydrocarbon feedstock and steam is fed via line 60 to a heat exchange reformer having a process fluid feed zone 11, a heat exchange zone 12, a process fluid off-take zone 13 and first 14 and second 15 boundary means separating said zones from one another. The process fluid is subjected to steam reforming in a plurality of heat exchange tubes 17 containing a steam reforming catalyst to give a primary reformed gas stream. The primary reformed gas stream passes from said heat exchange tubes 17 to the process fluid off-take zone 13, and thence via line 61 to further processing. The further processing comprises partial combustion in a secondary reforming vessel 62 with an oxygen-containing gas, supplied via line 63, above a bed of secondary reforming catalyst 64, for example nickel supported on calcium aluminate or alumina. The resultant partially combusted gas passes through the bed of reforming catalyst 64 and is then passed from the vessel 62 via line 65 to heat exchange zone 12 as the heat exchange medium. The heat exchange medium passes up through the spaces between the heat-exchange tubes and exits the reformer via line 36.

EXAMPLES

The invention is further illustrated with reference to the following calculated example in accordance with the embodiments illustrated in FIGS. 4 and 6.

Example 1

A heat exchange reformer is designed with 55 catalyst containing tubes (17) having a 98 mm outside diameter on a 122 mm pitch mounted inside a cylindrical vessel of 1000 mm inside diameter. The tubes are filled with cylindrical catalyst pellets of nickel impregnated on alumina, 17 mm long, and 14 mm diameter with 4 through holes 4 mm diameter aligned with the axis of the pellet. Outside of the catalyst tubes are mounted a series sheath tubes (50) which are 108 mm inside diameter giving a 5 mm annular flow passage between the catalyst and sheath tubes. Fins (52) are not present. The tube-side is fed with the following process gas at a pressure suitable to give a tube outlet pressure of 45.8 bar abs and at a temperature of 425° C.

| | Component | | | | | | | | |
|---|---|---|---|---|---|---|---|---|---|
| | $CH_4$ | $C_2H_6$ | $C_3H_8$ | $C_4H_{10}$ | $H_2$ | $H_2O$ | $CO$ | $CO_2$ | $N_2$ |
| Flowrate Kmol/hr | 368.5 | 21.7 | 2.2 | 3.6 | 15.6 | 1080.0 | 1.3 | 13.0 | 2.9 |

The shell-side is fed with the following heat exchange gas at a pressure of 41.88 bar abs, and a temperature of 1025° C. corresponding to a secondary reformed gas mixture (65).

| | Component | | | | | |
|---|---|---|---|---|---|---|
| | $CH_4$ | $H_2$ | $H_2O$ | $CO$ | $CO_2$ | $N_2$ |
| Flowrate Kmol/hr | 12.2 | 1012.3 | 887.9 | 258.4 | 176.6 | 3.8 |

In a first tube bundle, not according to the present invention, the catalyst tubes are 10.75 m long and the sheath tubes are 10.75 m long giving enhanced heat transfer along the complete length of the catalyst tubes. The heat exchange medium is fed into the reformer below the heated length of the tubes. When the catalyst is in good condition, the catalyst tube temperature and differential pressure at a point 10% above the bottom of the catalyst in tube (17) are 775° C. and 4.16 bar respectively. Over time, catalyst fragments and dust build up in the bottom 10% of the catalyst tube length. This causes the catalyst pressure drop to rise and its heat transfer performance to reduce, leading to an increase in the catalyst tube surface temperature and differential pressure. Where the pressure drop coefficient for the catalyst increases by a factor of 10 and the heat transfer coefficient reduces by a factor of 5, the catalyst tube temperature and differential pressure at a point 10% above the bottom of the catalyst tube are 903° C. and 6.20 bar respectively.

In an embodiment according to the present invention, in a second tube bundle catalyst tubes 17 are 11.5 m long and the sheath tubes 22 are 10.00 m long giving lower heat transfer over the bottom 13% of the catalyst tubes and enhanced heat transfer along the remaining 87% of the catalyst tubes. The first and second tube bundles have exactly the same heat transfer performance overall. When the catalyst is in good condition, the tube temperature and differential pressure at a point 10% above the bottom of the tube are 745° C. and 4.15 bar respectively. Over time, catalyst fragments and dust build up in the bottom 10% of the tubes. This causes the catalyst pressure drop to rise and its heat transfer performance to reduce, leading to an increase in the catalyst tube surface temperature and differential pressure. Where the pressure drop coefficient for the catalyst increases by a factor of 10 and the heat transfer coefficient reduces by a factor of 5, the catalyst tube temperature and differential pressure at a point 10% above the bottom of the catalyst tube are 854° C. and 6.35 bar respectively.

If it is assumed that in both tube bundles the catalyst tubes were constructed of alloy 800HT (which is a well known commercially available high temperature iron/nickel/chrome based alloy) with a wall thickness of 2 mm the tubes, with catalyst in good condition the catalyst tubes would operate for in excess of 100,000 hours before rupture, which is the nominal design life for reformer tubes. In the case of the first bundle with damaged catalyst, a tube temperature of 903° C.

and differential pressure of 6.20 bar would result in a tube life of less than 100,000 hours before rupture and a figure of approximately 20,000 hours has been calculated as the expected tube life under these conditions. In the case of the second tube bundle with damaged catalyst, a tube temperature of 854° C. and differential pressure of 6.35 bar would result in a tube life of greater than 100,000 hours before rupture and a figure of approximately 300,000 hours has been calculated as the expected tube life under these conditions.

Thus, the lower heat transfer region at the bottom of the catalyst tubes in the second bundle has made it less sensitive to damaged catalyst. Should the catalyst damage be worse than modelled, the reduction in life for the tubes in the first bundle would be even greater than that calculated. For the second bundle, to provide the same tube life in the case of catalyst damage without the zone of lower heat exchange, would require the tube thickness to be increased to approximately 3.3 mm which would have a detrimental impact upon the cost of the tube bundle and the heat transfer capability of the bundle as the extra tube thickness would increase the resistance to heat transfer.

The invention claimed is:

1. Apparatus for steam reforming of hydrocarbons comprising a heat exchange reformer having a process fluid off-take zone at a first end, a heat exchange zone, and a process fluid feed zone at a second end opposite the first end, said heat exchange reformer comprising a plurality of vertical catalyst-filled tubes disposed within said heat exchange zone and having external tube surfaces, wherein: (i) said plurality of vertical catalyst-filled tubes are adapted to allow for passage of a process fluid comprising hydrocarbon and steam; (ii) heat may be transferred to said plurality of vertical catalyst-filled tubes by a heat exchange medium flowing around the external tube surfaces; (iii) the catalyst of the catalyst-filled tubes extends for a catalyst depth within the heat exchange zone from a first position near the first end to a second position near the second end; and wherein said apparatus further comprises heat exchange enhancement means comprising transverse baffles provided within the heat exchange zone so that the catalyst-filled tubes have a zone of lower heat exchange extending from the first position of the catalyst-filled tubes to a level in the range of 5 to 25% of the catalyst depth, wherein no heat exchange enhancement means are provided in said zone of lower heat exchange.

2. Apparatus according to claim 1 further comprising heating means comprising partial oxidation means or combustion means adapted to heat the heat exchange medium.

3. Apparatus according to claim 2 wherein the heating means comprises a secondary reformer.

4. Apparatus according to claim 1 further comprising heat exchange reducing means are provided within said zone of lower heat exchange.

5. Apparatus according to claim 4 wherein the heat exchange reducing means comprise ceramic fibre blankets or refractory layers applied to the tubes or tube plates or open-ended shrouds that prevent access of heating medium to the tube surfaces.

6. Apparatus according to claim 1 wherein the zone of lower heat exchange is ≦15% of the catalyst depth.

7. Apparatus according to claim 1 further comprising heat exchange medium distribution means are provided within the reformer so that the flow of heat exchange medium in the zone of lower heat exchange is substantially axially aligned with the catalyst-filled tubes.

8. Apparatus according to claim 1 wherein the catalyst comprises Ni on a shaped refractory support.

9. A process for steam reforming of hydrocarbons to generate a reformed gas mixture, including the steps of (i) passing a gas mixture, comprising hydrocarbon and steam through a plurality of catalyst-filled tubes having external surfaces and disposed vertically within a heat exchange reformer, and (ii) transferring heat to the mixture undergoing reforming by a heat exchange medium flowing around the external surfaces of said tubes, wherein the catalyst of the catalyst-filled tubes extends for a catalyst depth from a first position near a first end of the reformer to a second position near a second end of the reformer opposite the first end, and wherein the reformer comprises heat exchange enhancement means comprising transverse baffles within the reformer so the heat transferred between the heat exchange medium and said gas mixture passing through said tubes is lower in a zone of lower heat exchange extending from the first position of the catalyst-filled tubes to a level in the range of 5 to 25% of the catalyst depth, than the heat transferred between the heat exchange medium and said mixture above said zone of lower heat exchange, wherein no heat exchange enhancement means are provided in said zone of lower heat exchange so that the temperature of the external surfaces of the tubes in said zone is lower.

10. A process according to claim 9 wherein the heat exchange medium is either the reformed gas mixture that has been subjected to a further process step comprising a step of partial oxidation with an oxygen containing gas or a fluegas generated by the combustion of a suitable fuel.

11. A process according to claim 9 wherein the temperature of the external surfaces of the tubes in the zone of lower heat exchange is ≦20° C. cooler than the external surface of the tubes above said zone of lower heat exchange.

12. A methanol synthesis process comprising a reforming process according to claim 9.

13. An ammonia synthesis process comprising a reforming process according to claim 9.

14. A Fischer-Tropsch hydrocarbon liquid synthesis process comprising a reforming process according to claim 9.

15. Apparatus according to claim 1 wherein a first boundary means defines a boundary between the process fluid feed zone and the heat exchange zone, and a second boundary means defines a second boundary between the heat exchange zone and the process fluid off-take zone, wherein the plurality of vertical catalyst-filled tubes are non-moveably attached to the first boundary means and moveably attached to the second boundary means.

* * * * *

UNITED STATES PATENT AND TRADEMARK OFFICE
CERTIFICATE OF CORRECTION

| | | |
|---|---|---|
| PATENT NO. | : 7,731,935 B2 | Page 1 of 1 |
| APPLICATION NO. | : 11/911298 | |
| DATED | : June 8, 2010 | |
| INVENTOR(S) | : Stuart Ballentyne Brady et al. | |

It is certified that error appears in the above-identified patent and that said Letters Patent is hereby corrected as shown below:

At column 11, line 51:

"exchange reducing means arc provided within said zone"

should read:

--exchange reducing means provided within said zone--.

At column 12, line 40, "$\leq 20°C$" should read --$\geq 20°C$--.

Signed and Sealed this
Fourth Day of January, 2011

David J. Kappos
*Director of the United States Patent and Trademark Office*